United States Patent
Staraj et al.

(10) Patent No.: US 10,229,299 B2
(45) Date of Patent: Mar. 12, 2019

(54) RFID DEVICE FOR DETERMINING THE OPERATING STATUS AND IDENTIFICATION OF AN ELECTRIC APPLIANCE

(71) Applicants: CENTRE NATIONAL DE LA RECHERCHE SCIENTIFIQUE, Paris (FR); UNIVERSITE DE NICE-SOPHIA ANTIPOLIS, Nice (FR)

(72) Inventors: Robert Staraj, Saint-Paul (FR); Jean-Marc Ribero, Nice (FR); Mathieu Cosker, Brest (FR)

(73) Assignees: CENTRE NATIONAL DE LA RECHERCHE SCIENTIFIQUE, Paris (FR); UNIVERSITE NICE-SOPHIA ANTIPOLIS, Nice (FR)

( * ) Notice: Subject to any disclaimer, the term of this patent is extended or adjusted under 35 U.S.C. 154(b) by 0 days.

(21) Appl. No.: 15/738,514

(22) PCT Filed: Jun. 24, 2016

(86) PCT No.: PCT/EP2016/064734
§ 371 (c)(1),
(2) Date: Dec. 20, 2017

(87) PCT Pub. No.: WO2016/207389
PCT Pub. Date: Dec. 29, 2016

(65) Prior Publication Data
US 2018/0181779 A1    Jun. 28, 2018

(30) Foreign Application Priority Data

Jun. 26, 2015 (FR) .................................... 15 55947

(51) Int. Cl.
*G06K 7/10* (2006.01)
*G06K 19/07* (2006.01)
*H04Q 9/00* (2006.01)

(52) U.S. Cl.
CPC ..... *G06K 7/10366* (2013.01); *G06K 19/0723* (2013.01); *H04Q 9/00* (2013.01); *H04Q 2209/47* (2013.01); *H04Q 2209/886* (2013.01)

(58) Field of Classification Search
CPC .......... G06K 7/10148; G06K 7/10366; G06K 19/0726; G01R 21/331; G01R 21/133
See application file for complete search history.

(56) References Cited

U.S. PATENT DOCUMENTS 9,785,809 B2 * 10/2017 Louzir ................. G01R 21/133
9,893,411 B2 *  2/2018 Louzir ............... G06K 7/10316
(Continued)

FOREIGN PATENT DOCUMENTS

EP    1 857 302 A1    11/2007
EP    2 796 834 A1    10/2014

*Primary Examiner* — Suezu Ellis
(74) *Attorney, Agent, or Firm* — Baker & Hostetler LLP

(57) ABSTRACT

A device for identifying an electrical appliance when it is powered up includes a current detector coupled to an electrical power supply cable of the electrical appliance, for detecting the passage of an electrical current in the cable and generating an electrical signal. A voltage generator converts the electrical signal at the output of the current detector into a direct voltage. An RFID circuit stores identification information, coupled to an antenna suitable for receiving and transmitting signals from and to an RFID reader. The device includes a control circuit coupled to the voltage generator and to the RFID circuit, the control circuit configured for producing a change of impedance of the antenna when the direct voltage is applied, the change of impedance allowing to transmit the identification information to the RFID reader.

9 Claims, 2 Drawing Sheets

(56) References Cited

U.S. PATENT DOCUMENTS

| | | | |
|---|---|---|---|
| 10,003,863 B2* | 6/2018 | Louzir | G01D 4/00 |
| 2009/0167494 A1* | 7/2009 | Martins | G01R 21/133 |
| | | | 340/10.1 |

* cited by examiner

RFID DEVICE FOR DETERMINING THE OPERATING STATUS AND IDENTIFICATION OF AN ELECTRIC APPLIANCE

CROSS-REFERENCE TO RELATED APPLICATIONS

This application is a National Stage of International patent application PCT/EP2016/064734, filed on Jun. 24, 2016, which claims priority to foreign French patent application No. FR 1555947, filed on Jun. 26, 2015, the disclosures of which are incorporated by reference in their entirety.

FIELD OF THE INVENTION

The invention relates to the field of RFID systems, and in particular the use of such systems for determining the state of operation of an electrical appliance and for identifying said appliance.

BACKGROUND

RFID devices are these days widely used for identification purposes. The principle of operation of an RFID system is generally that a label coupled and matched to an antenna is affixed to an object, or an animal or a human being to assign a unique identifier thereto. In addition to the identification of electrical appliances, the need has emerged to track the operation of such appliances, whether it be to extract electrical consumption information or maintenance information for example. There are solutions to this need, but they are generally disassociated from the identification systems.

The patent application EP2796834A1 from Thomson Licensing presents an RFID identification system for detecting the activity of domestic electrical appliances. The system consists of passive RFID tags attached to each electrical power supply cord of each appliance, and of means for detecting a change in the electrical consumption of the appliances. When a change is detected, an RFID reader can then read the data from the RFID tags. This solution is based on the detection of current peaks on the power supply cord of an electrical appliance provoked by a change of state of the appliance, when it is switched on and switched off. The current pulse detected activates the RFID tag placed on the electrical cord to write a 0 or 1 bit in a memory of the integrated circuit depending on the status of the appliance. By correlation with a total consumption difference measured on the electrical meter of the home, and by interrogating all of the RFID tags, it is possible to determine which appliance has just been switched on or switched off. Thus, this type of approach requires the use of the RFID tags of read/write type, and requires the retrieval of the data on a meter of a general meter.

There is a need for a solution which mitigates the drawbacks of the known approaches. The present invention meets this need.

SUMMARY OF THE INVENTION

One object of the present invention is to propose an integrated solution for detecting the state of operation of an electrical appliance and for identifying this appliance.

The general principle of the solution is to have a unit inserted between an electrical outlet and an electrical appliance to be monitored. The unit comprises a circuit which makes it possible to detect the passage of an electrical current and then induce a sufficient voltage at the terminals of a coil to switch a diode. This diode changes the state of resonance of the antenna of an RFID tag placed in the unit. An electrical appliance which is operating appears in the reading field of an RFID reader.

Advantageously, the system of the invention operates with basic RFID tags storing an identifier and does not require the retrieval of the data on a general meter.

Advantageously, the proposed device is limited in terms of electronic components, thus offering a reduced manufacturing cost.

In a preferential embodiment, a device for determining the state of operation of an electrical appliance and for identifying said appliance comprises:

a current detector coupled to a power supply cable of the electrical appliance, for detecting the passage of a current in said cable and generating an electrical signal;

a voltage generator for converting the electrical signal at the output of the current detector into a direct voltage;

an RFID circuit allowing to store identification information, coupled to an antenna suitable for receiving and transmitting signals from and to an RFID reader;

the device being characterized in that it comprises a control circuit coupled to the voltage generator and to the RFID circuit, said control circuit comprising means for producing a change of impedance of the antenna when the direct voltage is applied, the change of impedance allowing to transmit the identification information to the RFID reader.

Advantageously the change of impedance of the antenna makes it possible to bring the frequency of the antenna to the resonance frequency of the RFID reader. In a preferential implementation, the frequency of the RFID reader is a UHF band frequency at 868 MHz. In a variant embodiment, the antenna is a dipole-type antenna. The identification information is an identifier of the identification code of the RFID tag linked to the system.

In one implementation, the current detector comprises a transformer coupled by induction to the power supply cable.

In one embodiment, the voltage generator is a circuit of Schenkel doubler type.

In a variant implementation, the control circuit comprises at least one PIN diode.

The invention relates also to a method for determining the state of operation of an electrical appliance and identifying said appliance, the method comprising the steps of:

detecting the passage of an electrical current in the power supply cable of the electrical appliance;

generating a direct voltage representative of the electrical current;

applying the direct voltage to the terminals of a control device, the control device being coupled to an RFID circuit allowing to store identification information and being coupled to an antenna suitable for receiving and transmitting signals from and to an RFID reader, said control circuit allowing to produce a change of impedance of the antenna when the direct voltage is applied, the change of impedance allowing to transmit the identification information to the RFID reader.

DESCRIPTION OF THE FIGURES

Different aspects and advantages of the invention will emerge in support of the description of a preferred but non-limiting mode of implementation of the invention, with reference to the figures below.

DETAILED DESCRIPTION OF THE INVENTION

Figure 1:
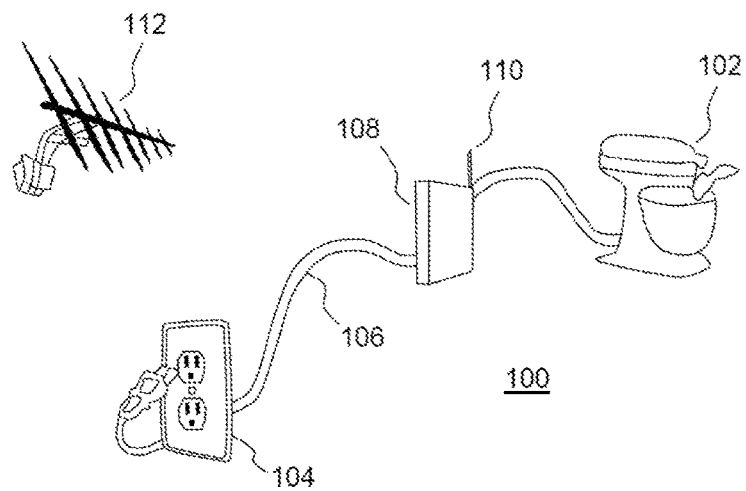
FIG. 1 illustrates a general representation of the device of the invention.

As illustrated in FIG. 1, the device of the invention is generally used in an environment 100 of electrical appliances 102 linked to electrical power supplies 104 of wall outlet type for example, by a power supply cable 106. Advantageously, the device of the invention is incorporated in a unit of small size 108 coupled to the power supply cable of the electrical appliance. It comprises an RFID electronic circuit with an antenna 110 and electronic control system. The control system is low consumption, powered and controlled by a coil, like the one detailed with reference to FIG. 3. The unit is preferentially made of a non-metallic material to ensure electrical insulation of the user and allow a good propagation of the electromagnetic waves. The RFID electronic circuit or label or tag assigns a unique identifier to the electrical appliance. The RFID tag is of passive type, without stand-alone power supply, and, for its activation, uses the electrical current circulating in the power supply cable of the electrical appliance connected to the mains.

An RFID reader 112 allows the identification of the objects present within its detection space. The reader, also called interrogator is an active device capable of identifying of identifying one or more tags situated within its coverage zone by virtue of the sending of an electromagnetic wave via its own antenna. This wave has a frequency which is generally defined by an RFID standard (for example 868 MHz in Europe) and it contains an interrogation passage to the tags. For the communication to be established, the antenna of the reader must operate at the same frequency as the antenna of the tag. Unlike objects traditionally identified by the RFID systems, the identification made according to the principle of the invention takes place only if a power supply current runs through the power supply cable of the appliance, on one of the phases of the cable.

In the absence of power supply current in the cable, the antenna of the device 108 does not operate on the correct frequency of the standard used by the RFID circuit. The antenna system is mismatched, and it does not respond to the permanent interrogating signal originating from the RFID reader 112.

The power supply current of the appliance which is detected is used to power one or more diodes of the control circuit of the device 108 which will set the antenna 110 to the correct resonance frequency in the standard considered by extending its electrical length.

When the antenna is reactivated at the correct operating frequency, it can pick up the electromagnetic field coming from the RFID reader 112 in which it is permanently immersed and thus power the RFID chip of the device 108.

The power supply current which is detected is converted into a signal which is sent to the RFID chip. It has sufficient power for the chip to extract therefrom an operating energy, the clock and the interrogation message from the reader. Using the energy harvested, the chip constructs its response message consisting primarily of the identifier. It transmits it to the antenna 110 of the device, already used in reception, which will then respond to the RFID reader 112, by returning to it the identifier assigned to the electrical appliance. The appearance of the identifier in the field of detection of the RFID reader 112, allows supervisory software associated with the RFID reader to indicate that the identified appliance is switched on.

Thus, the general principle of the present invention is that of a conditional activation of an RFID reading system, the condition being the detection of a current passing in the power supply cable of an electrical appliance which makes it possible to render the RFID tag visible and identifiable only in the presence of this current.

The appearance of the identifier linked to this appliance in the registers of a supervisory computer makes it possible to detect the starting up of this specific appliance, and to then use this information in various ways.

Figure 2:
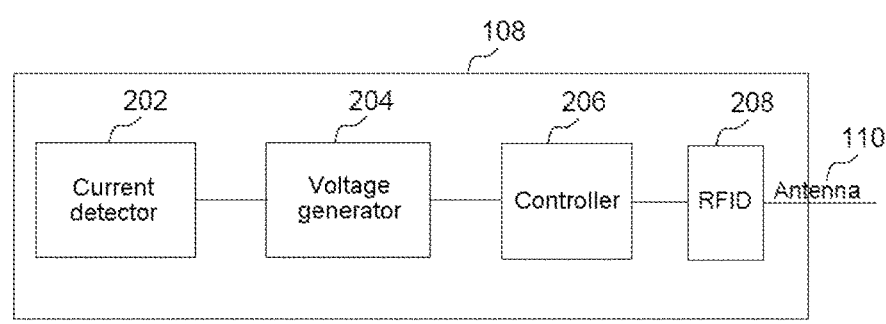
FIG. 2 is a functional block diagram of the device of the invention.

FIG. 2 shows the functional blocks of the device 108 of the invention which comprises a current detector 202, a direct voltage generator 204, a control circuit 206, an RFID circuit 208 and an associated antenna 110.

The RFID circuit 208 is based on a basic passive RFID circuit which has an integrated electronic circuit or a chip for storing identification information of a unique identifier type. This identifier is assigned to the electrical appliance using the power supply cable to which the device of the invention is fixed.

Figure 3:
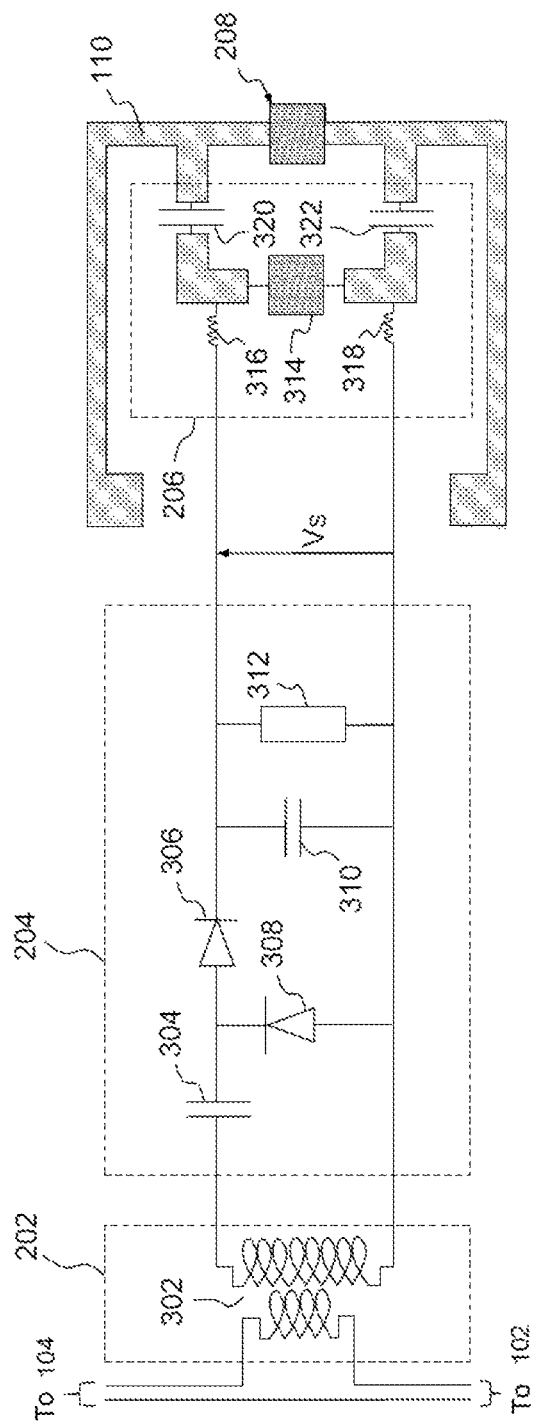
FIG. 3 shows a possible implementation of the device of the invention.

The antenna 110 is preferable a printed dipole-type antenna that can include a matching line as illustrated in FIG. 3. Alternatively it can take different forms to best exploit the space available, like a meandering or patch dipole antenna.

The principle of the invention is to allow the identification of the operation an electrical appliance only in the presence of a current in the power supply cable. The information given by the passage of the current is taken by the current detector 202. In a preferential implementation, as illustrated in FIG. 3, the current detector is a system or coupling coil type wound around a phase wire of the power supply cable. The current detector 202 is coupled to a voltage generator 204 which makes it possible to supply a direct voltage at the output from the signal originating from the current detector.

A control block 206 coupled to the output of the voltage generator makes it possible to control the activation of the antenna 110 and of the RFID circuit 208. The control circuit comprises means for producing a change of impedance of the antenna 110 when the direct voltage is applied, the change of impedance allowing to transmit the identification information to the RFID reader.

FIG. 3 shows a preferential implementation of the device 108 of the invention. The current detector 202 is composed of a transformer 302 which makes it possible to recover, by induction, an electrical signal at its terminals when a current circulates in the primary circuit consisting of the power supply wire. The transformer 302 makes it possible, using a winding around a ferrite core, to harvest sufficient energy from the power supply cable to power the RFID electronic circuit 208.

The electrical signal which is detected is rectified and filtered in order to deliver a direct control voltage Vs that is sufficient to power the control circuit 206. The direct voltage generator 204 is a circuit of voltage rectifier type. In a preferential implementation, the direct voltage generator is a known circuit called "Schenkel doubler" comprising a first capacitor 304 coupled to two Schottky diodes (306, 308), a second capacitor 310 connected in parallel to a resistor 312.

The direct voltage Vs is applied at the input of the control circuit 206. The control circuit comprises electronic components used as switches. In a preferential implementation, the components consist of one or more fast-switching diodes 314, of PIN (Positive Intrinsic Negative) diode type, which are powered by the direct voltage Vs. A person skilled in the art understands that additional components may be provided such as inductors (316, 318) for example, or capacitors (322, 324) to avoid current peaks in the RFID circuit 208.

The integrated circuit of the RFID 208 and/or the antenna 110 are linked to the control voltage Vs. In the absence of primary current in the wire of the power supply cable, the antenna 110 is not tuned to the correct frequency by the standard of the reader 112 and that does not allow the integrated circuit to operate. In the presence of a primary current in the wire of the power supply cable, the voltage Vs reaches a value that makes it possible to power the PIN diode or diodes of the control circuit 206 which will circuit the antenna 110 to the correct resonance frequency in the standard considered by extending its electrical length.

The antenna becomes tuned to the frequency of the signal from the reader 112 and the integrated circuit of the RFID becomes operational. The signal received by the antenna 110 is of sufficient power to allow the integrated circuit to extract its operating energy. Using the harvested energy, a response signal is transmitted to the antenna 110 of the RFID, which responds to the reader 112.

In a variant of implementation, the control circuit 206 can be coupled to the RFID circuit so as to short-circuit the integrated circuit when there is no current detected and set the RFID chip to an operating state when a current is detected.

Thus, the present description illustrates various non-limiting implementations of the invention. Examples have been described to allow a good understanding of the principles of the invention, but they are in no way exhaustive and should allow the person skilled in the art to add modifications and implementation variants while retaining the same principles.

The invention claimed is:

1. A device for determining a state of operation of an electrical appliance and for identifying said appliance, the device comprising:
   a current detector coupled to a power supply cable of the electrical appliance, for detecting the passage of a current in said cable and generating an electrical signal;
   a voltage generator for converting the electrical signal at the output of the current detector into a direct voltage;
   a radio frequency identification (RFID) circuit allowing to store identification information, coupled to an antenna suitable for receiving and transmitting signals from and to an RFID reader;
   the device comprising a control circuit coupled to the voltage generator and to the RFID circuit, said control circuit comprising means for producing a change of impedance of the antenna when the direct voltage is applied, the change of impedance allowing to transmit the identification information to the RFID reader.

2. The device as claimed in claim 1, wherein the change of impedance of the antenna consists in bringing a frequency of the antenna to a resonance frequency of the RFID reader.

3. The device as claimed in claim 1, wherein the current detector comprises a transformer coupled by induction to the power supply cable.

4. The device as claimed in claim 1, wherein the voltage generator is a circuit of Schenkel doubler type.

5. The device as claimed in claim 1, wherein a frequency of the RFID reader is a UHF band frequency at 868 MHz.

6. The device as claimed in claim 1, wherein the antenna is a dipole-type antenna.

7. The device as claimed in claim 1, wherein the identification information is an identifier of the electrical appliance.

8. The device as claimed in claim 1, wherein the control circuit comprises at least one PIN diode.

9. A method for determining a state of operation of an electrical appliance and identifying said appliance, the method comprising:
   detecting the passage of an electrical current in an electrical power supply cable of the electrical appliance;
   generating a direct voltage representative of the electrical current;
   applying the direct voltage to said terminals of a control device, the control device being coupled to a radio frequency identification (RFID) circuit allowing to store identification information and being coupled to an antenna suitable for receiving and transmitting signals from and to an RFID reader, said control device allowing to produce a change of impedance of the antenna when the direct voltage is applied, the change of impedance allowing to transmit the identification information to the RFID reader.

* * * * *